United States Patent [19]

Marino et al.

[11] Patent Number: 4,561,306

[45] Date of Patent: Dec. 31, 1985

[54] INSTRUMENTATION SUPPORT RING FOR HIGH-POWER ROTARY MACHINE ROTOR AND METHOD FOR ATTACHING SAME TO ROTOR SHAFT

[75] Inventors: Jean-Claude Marino, Montigny; André Marquet; Philippe Wetzel, both of Paris, all of France

[73] Assignee: Electricite de France Service National, Paris, France

[21] Appl. No.: 666,570

[22] Filed: Oct. 30, 1984

[30] Foreign Application Priority Data

Nov. 2, 1983 [FR] France ............................ 83 17401

[51] Int. Cl.⁴ .................... B29C 63/04; G01D 21/00; G01D 11/24
[52] U.S. Cl. ............................ 73/432 R; 73/431; 242/7.02
[58] Field of Search .............. 73/431, 432 R, 432 B, 73/862.19, 862.32; 374/153, 154; 242/7.02

[56] References Cited

U.S. PATENT DOCUMENTS

| | | | |
|---|---|---|---|
| 3,268,880 | 8/1966 | Miller | 374/153 |
| 3,319,464 | 5/1967 | Bender | 73/862.36 |
| 3,504,474 | 4/1970 | Dykmans | 242/7.02 |
| 4,518,962 | 5/1985 | Imose et al. | 374/154 |

FOREIGN PATENT DOCUMENTS 2359695 2/1978 France .

Primary Examiner—S. Clement Swisher
Attorney, Agent, or Firm—Charles E. Brown; Charles A. Brown

[57] ABSTRACT

A ring designed to support instrumentation modules on the rotor of a rotary machine and to withstand centrifugal accelerations significantly in excess of 500 g comprises two half-rings made of zicral (AZ5GU) alloy clamped to the rotor shaft. In order for the ring to remain attached to the shaft at speeds up to and in excess of the maximum speed thereof, there are formed in the cylindrical perimeter of the ring a central groove and two side grooves. A tape of glass fibers impregnated with a polymerizable resin is wound on under tension in superposed layers, initially into the central groove and then into the side grooves. The wound tape is then immobilized under tension by polymerizing the resin.

11 Claims, 8 Drawing Figures

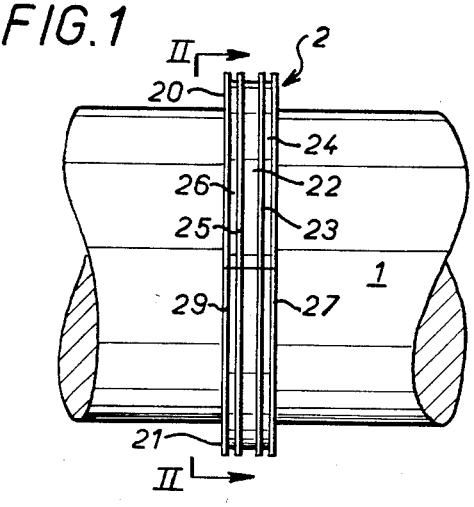
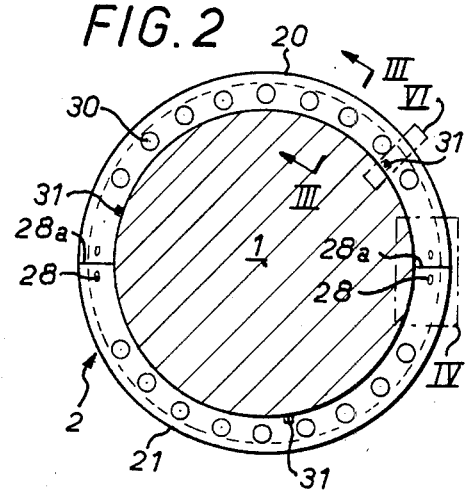
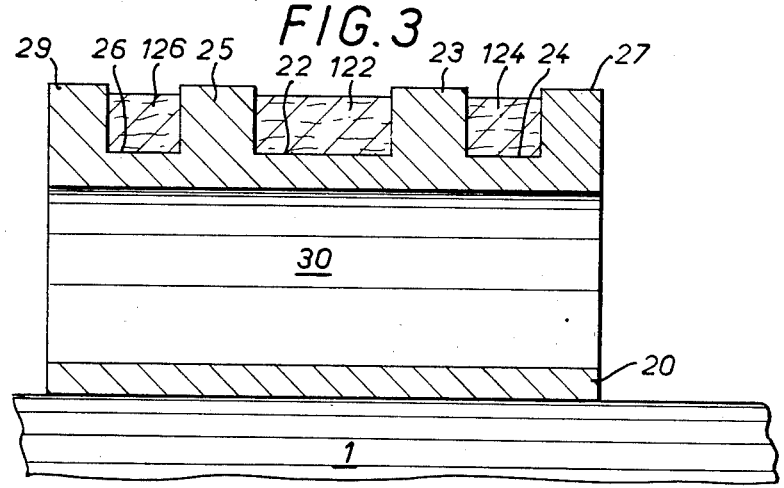
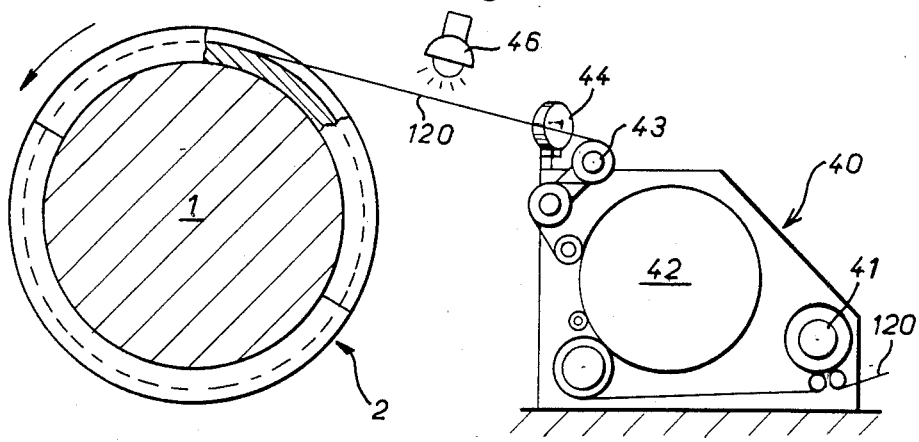

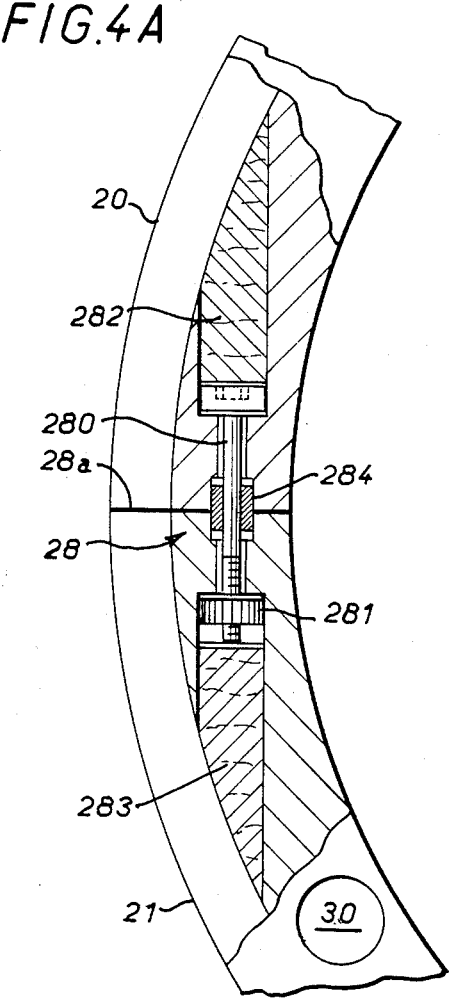
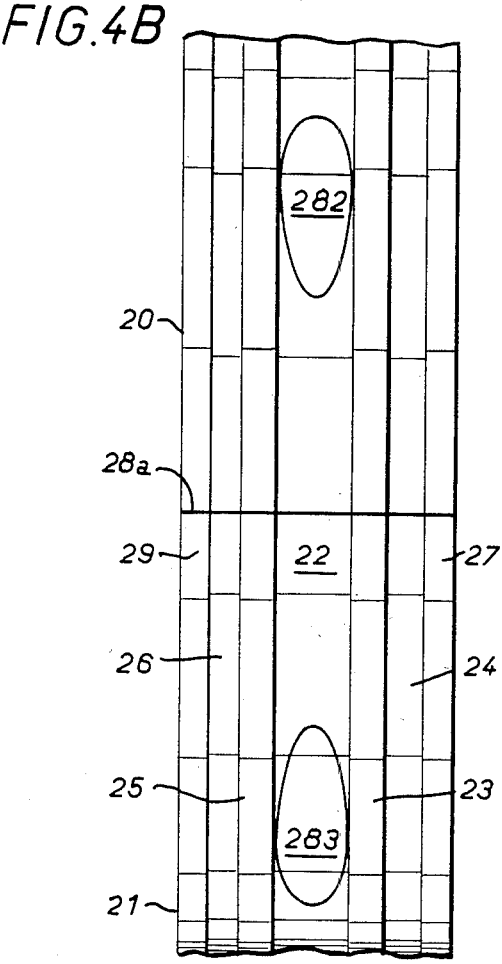
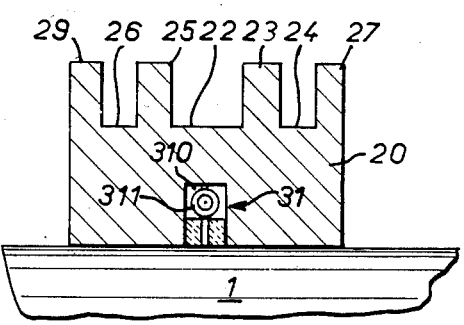
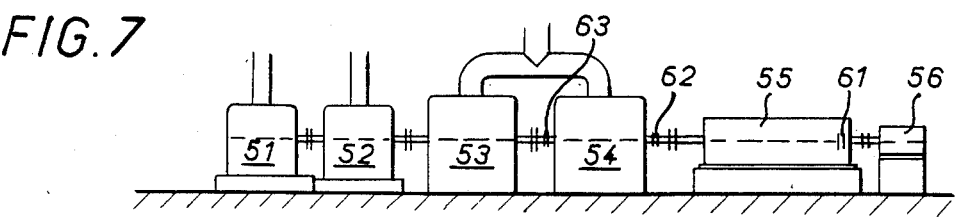

INSTRUMENTATION SUPPORT RING FOR HIGH-POWER ROTARY MACHINE ROTOR AND METHOD FOR ATTACHING SAME TO ROTOR SHAFT

BACKGROUND OF THE INVENTION

1. Field of the Invention

The invention relates to an instrumentation module support ring for rotors of rotary machines, and in particular turbo-generator sets, designed to withstand accelerations in excess of 5,000 m/s$^2$ and comprising two half-rings clamped to the rotor shaft so as to remain attached thereto for speeds up to and in excess of the maximum speed of the rotor.

2. Description of the Prior Art

By the term rotary machine rotor instrumentation is meant apparatus which is fitted to the rotor of an existing machine in order to determine under real operating conditions various operating parameters, in particular mechanical and thermal parameters. This equipment comprises parameter sensors, devices associated with the sensors to generate electrical signals representative of the parameters measured, equipment for displaying, recording and processing these electrical signals, disposed externally of the rotary machine, and coupling means for connecting the devices associated with the sensors to a power supply and to external equipment. These coupling means are generally coreless transformers consisting of coaxial loops associated in pairs, one loop of the pair being fixed and the other rotating with the rotor around its axis.

The sensors are naturally disposed at locations on the rotor at which the parameters to be measured are of particular significance. On the other hand, the associated equipment and the rotating loops are disposed at locations which are appropriately distanced from the rotor shaft and mounted on support rings attached to the shaft at these locations. For convenience and safety when mounting the associated devices on a support ring, the devices are often divided into modules of comparable weight, shape and dimensions.

The present invention was developed in the context of instrumentation for the rotors of high-power turbo-generator sets. As the cost of producing electrical energy, particularly at the base level, is inversely proportional to the unit power of the turbo-generator set (or of the combined plant, grouping the turbo-generator set(s) with the associated steam raising installation, especially when nuclear-powered), the trend is for turbo-generator sets to be increasingly powerful and, as a corollary of this, for the shaft lines to be lengthened for technical reasons and for the reliability of the set to be enhanced for operating reasons, by virtue of the cost involved in shutting down the plant. Note that nuclear-powered plant is designed to be shut down annually, their period of uninterrupted operation being extendable in emergency to 18 months.

The shaft lines of the more recent sets are up to some 50 meters long, with rotating masses of several hundred tonnes, more or less concentrated. The behavior of the shaft lines, especially in response to high-amplitude disturbances on the distribution network, such as nearby faults, the impedance of which as seen by the alternator is very low, is subject to intensive research, not only to specify the torsion fatigue strength of the shafts but also to analyze transient electrical conditions which originate in the alternator as a consequence of such disturbances, by virtue of the mechanical forces on the shafts.

In parallel with the lengthening of the shaft lines, the increase in the power rating results in an increase in the shaft diameter needed to transmit the torque. The shaft diameter typically varies between 500 and 700 mm according to the unit power rating. The levels of centrifugal acceleration at the periphery of these shafts respectively amount to 25,000 and 8,750 m/s$^2$ or, taking the acceleration due to gravity g as a reference, approximately 2,500 g and 875 g. It need hardly be said that an instrumentation support ring must be designed to safely withstand the maximum centrifugal acceleration involved.

However, it is necessary to distinguish between the degrees of seriousness of the defects which may affect the ring, in order to evaluate the reliability required with regard to such defects. In order of increasing seriousness consideration must be given to: (a) defects concerning only the instrumentation, (b) defects which may compromise the availability of the set, (c) defects which make an emergency shutdown imperative and, finally, (d) defects resulting in serious damage to equipment and injury to personnel.

An emergency shutdown is achieved in approximately 10 minutes by venting to atmosphere the steam feeds to the various parts of the turbine; a normal turbo-generator set shutdown cycle, up to the time at which it is possible to work on the set, routinely takes three days, and to bring the set on line takes about 24 hours, inter alia to avoid distortion of the shaft line due to thermal imbalances.

Defects in category (a) have a nuisance value in that they interrupt the work in progress, but they do not necessitate a premature shutdown of the turbo-generator set. A typical defect of category (a) is a break in the connections from the instrumentation modules to the sensors by virtue of relative rotation between the ring and the shaft, to which it is insufficiently tightly clamped. Defects of category (b) entail a premature shutdown, but under normal conditions; this type of defect relates in practice to the reliability of the support ring, resulting in a "mean time before failure" which is too short, by virtue of mechanical fatigue, for example. Defects of category (c) are such that the seriousness may rapidly escalate to that of category (d). Category (d) defects also entail an emergency shutdown, and steps are taken to alleviate their consequences by means of external protection measures. Distinguishing between defects of categories (c) and (d) is tied to the ability to detect the appearance of the defect in time or not.

Attempts have been made to utilize instrumentation support rings consisting of two metal half-rings fastened together around the shaft and clamped to the shaft by means of a steel band applied when hot. This band was made up of a multiplicity of ring segments disposed on edge to constitute complete rings, bolts passing through all the rings to form a solid block; the gaps between segments in the same binding ring were naturally offset angularly between the binding rings so as to regularly distribute the weak points. The binding, assembled around the shaft beside the support ring, was then heated and slipped over the support ring.

The fitting of a hot steel binding, drawing inspiration from the techniques for constructing vessels subject to high pressures, has the disadvantage in applications to parts subjected to centrifugal accelerations that the mass of the binding is high and increases the forces acting on the building. To give a crude but meaningful approximation, from the stage at which the mass of the binding becomes equal to the mass of the ring which it is retaining in position, the increase in the resistance to centrifugal force obtained by increasing the cross-section of the binding serves more to compensate for the increase in the centrifugal forces due to the increased mass of the binding than to enhancing the binding of the ring.

During instrumentation tests on a 700 MW two-pole turbo-generator set with a shaft having a diameter of approximately 500 mm, loosening of the ring on the shaft was observed, resulting in an offset between the rotor shaft and the instrumentation support ring. Note that in this test the mass of the duralumin ring was of the order of 25 kg whereas that of the binding exceeded 100 kg.

Another proposed solution consists in making a ring of a light and extremely strong material which is sufficiently flexible for clamping of the two half-rings by means of bolts perpendicular to the plane of the mating surfaces (passing through the axis of the shaft) and disposed on the neutral fiber of the ring to achieve attachment of the ring to the shaft in such a way that practically all parts of the contacting surfaces are subject to substantially the same pressure. The material used was a polymerized resin reinforced with glass fibers in a crossed configuration. Tests of a ring of this kind with a mass between 5 and 7 kg on a turbo-generator set proved disappointing. After 20 days in service of the turbo-generator set equipped with this lightweight ring, circumferential cracks were found at the point of junction of the perimeter of the ring and the holes accommodating the clamping bolts. It should be noted that, in spite of these cracks, the ring was still locked tightly onto the shaft; even so, it was obvious that the mean time between failures was insufficient.

SUMMARY OF THE INVENTION

To overcome the problem of obtaining sufficient reliability with regard to defects of category (a) as well as with regard to defects of categories (b), (c) and (d), the invention proposes a rotary machine rotor instrumentation support ring comprising two half-rings adapted to be attached to the rotor so as to remain attached thereto at speeds up to and in excess of the maximum speed thereof, an odd number of annular grooves in an outside cylindrical surface of the ring in an arrangement which is symmetrical relative to a median plane thereof, and a respective winding in each of the grooves made up of superposed turns of a tape of high-strength fibers immobilized under tension in a polymerized resin matrix.

As is known, a binding with superposed turns enables all turns to contribute to the binding force, the tape tension in each turn making its contribution to the overall tension. A tape of high-strength fibers, such as glass fibers, immobilized in a matrix of polymerized resin makes it possible to form a binding of low inherent mass capable of maintaining the ring clamped to the shaft up to the required service speed. The grooves in which the bindings are accommodated provide an accurate guide for winding on the tape and contribute to retaining the tape in place without lateral displacement or expansion. Furthermore, the arrangement of the grooves with a central groove and symmetrically disposed side grooves is provided with the intention that the tape should be wound first into the central groove so that any elastic deformation of the bound ring, resulting for the most part from the first winding operation, is symmetrical relative to the median plane of the ring.

The high-strength fibers are preferably glass fibers, in spite of the higher strength of boron and carbon fibers. Glass fiber tapes pre-impregnated with polymerizable resin are commercially available, as are machines for winding on these tapes under tension, whereas carbon and boron fibers, used on an experimental basis, would entail considerable development time, not only in respect of implementation of the tape itself but also in respect of the method of applying same under tension.

The ring preferably comprises three grooves, the central groove being wider than the side grooves and having a width conditioned by the dimensions of the fastening bolts. Also, if the central binding predominates this facilitates achieving a balance on clamping up. There are also contra-indications against applying excessive asymmetric binding forces, which would entail the risk of unbalancing the clamping of the ring.

The ring preferably comprises a plurality of cylindrical bores parallel to the shaft axis in an arrangement which is symmetrical relative to the shaft axis and to the mating plane of the half-rings, which passes through this axis, these bores constituting housings for instrumentation modules. Forming the housings as cylindrical bores facilitates machining and does not result in any notching of the ring. There is no risk of the modules being expelled from their housings by centrifugal force, because of the orientation of the housings. Finally, the symmetrical disposition of the housings ensures that the ring is balanced in rotation relative to the axis and relative to the mating plane.

For enhanced safety in use, deformation sensors are disposed in recesses in the inside perimeter of the ring in abutting relationship thereto and to the shaft and in an equi-angularly spaced arrangement. These sensors provide information on elastic deformation of the ring under radial loads (centripetal building and centrifugal force); these sensors are employed in an analogous manner to the instrumentation sensors proper. The information provided can be used on fitting the bindings and during in-service operation.

Since the reliability of the instrumentation support ring results from the structure of the ring and from the binding process, in another aspect the invention consists in a method for attaching to a rotary machine rotor shaft a support ring of the aforementioned kind, in which method the half-rings are bolted together around the shaft, the tape of high-strength fibers is wound on under tension in superposed layers impregnated with a polymerizable resin, firstly into the central grooves and then into the other grooves on alternate sides of the central groove, and the resin is polymerized with the tape still under tension.

The advantages which result from ths method have already been explained in the comments on the specific structural features of the ring. Note that although it is essential to wind into the central groove first for reasons of reliability, this is not directly apparent from examining a ring in service.

Other objects and advantages of the invention will appear from the following description of an example of the invention, when considered in connection with the accompanying drawings, and the novel features will be particularly pointed out in the appended claims.

BRIEF DESCRIPTION OF THE DRAWINGS

FIG. 1 is a side view of a ring in accordance with the invention fitted to the rotor shaft of a rotary machine.

FIG. 2 is a cross-section on the plane II—II in FIG. 1.

FIG. 3 is a cross-section on the plane III—III in FIG. 2.

FIGS. 4A and 4B are views to a larger scale of the detail of FIG. 2 denoted IV, showing the interface between the half-rings.

FIG. 5 is a schematic diagram showing the winding on of a tape to bind the ring in accordance with the invention.

FIG. 6 is a view of the detail denoted VI in FIG. 2, showing the disposition of a displacement sensor between shaft and ring.

FIG. 7 is a schematic representation of the shaft line of a turbo-generator set equipped with three instrumentation rings in accordance with the invention.

DESCRIPTION OF THE PREFERRED EMBODIMENT

In the selected embodiment shown in FIGS. 1 through 3, a ring 2 is mounted on a rotor shaft 1 of a rotary machine. The ring 2 comprises two symmetrical half-rings 20 and 21 bolted together (28) along a mating plane 28a which passes through the axis of the shaft 1.

In each half-ring are formed cylindrical bores 30 extending parallel to the axis of the shaft 1; these bores 30 are disposed on a cylinder coaxial to the shaft, at an angular spacing of 15°. So as to balance the ring, the multiplicity of bores is symmetrical relative to the axis of the shaft 1 and relative to the mating plane 28a of the half-rings. Over 30° from the mating plane at each end each half-ring is free of bores so as to provide space for the fastening means 28.

Into the perimeter or rim of the ring are machined three annular grooves of rectangular cross-section, a central groove 22 and side grooves 24 and 26. The machining of the grooves leaves behind partition walls, end partition walls 27 and 29 and intermediate partition walls 23 and 24, between the central groove 22 and, respectively, the side grooves 24 and 26. The grooves are designed to accommodate the bindings 122, 124 and 126, as will be described in more detail hereinafter.

As the ring 2 is designed to withstand the effects of centrifugal forces, it is made from a type AZ5GU forged light alloy, available under the Trade Name "ZICRAL", which is subject to appropriate mechanical and thermal treatment so as to confer high mechanical strength on it (elastic limit 460 MPa, ultimate tensile strength 519 MPa).

To give an example, a ring matched to a 700 MW 3,000 rpm (50 Hz) turbo-generator set with a shaft diameter of 500 mm has a diameter to the outside of the partition walls of 632 mm and a diameter to the bottom of the grooves of 580 mm. The central groove 22 is 24 mm wide and the side grooves 24 and 26 are 12 mm wide; the intermediate partition walls 23 and 25 are 12 mm thick whereas the end partition walls 27 and 29 are 10 mm thick. The bores 30 have a diameter of 28.5 mm and are aligned with the neutral fiber cylinder of the ring which has a diameter of 540 mm. The mass of the ring is approximately 22.5 kg.

As can be seen in FIGS. 4A and 4B, the half-rings are attached to one another by a bolt type fastener 28. This bolt type fastener consists of a bolt 280 and nut 281, the head of the bolt 80 and the nut 281 bearing through washers on the faced bottoms of holes 282 and 283 formed in the half-rings 20 and 21, with an axis tangential to the neutral fiber in the mating plane 28a. The bolt 280 is centered on the axis of the hole by a tubular spacer 284 inserted into the holes in the half-rings from the mating plane 28a.

The diameter of the holes 282 and 283 is 4 mm less than the width of the central groove 22, so as not to cut into the radiused intersections of the bottom of the groove with the partition walls.

After the bolt type fasteners 28 have been tightened to a value of prestressing calculated for a speed of 3,000 rpm, so that the ring 2 is fastened to the shaft, the holes 282 and 283 are filled in with modeling plaster which is smoothed over to re-establish continuity along the bottom of the central groove 22. It should be noted that the bolt type fastenings 28 are designed to be able alone and with adequate safety margins to hold the half-rings together at least for the time necessary for an emergency shutdown of the set (approximately 10 minutes). As has previously been indicated more than once, the instrumentation support ring 2 can only fulfil its primary function if it remains attached to the shaft under all circumstances. This implies that the initial clamping force onto the shaft 1 is such that the residual clamping force in rotation, allowing for the oppositely directed centrifugal forces and thermal or plastic deformation of the ring, remains positive, with a reasonable safety margin. Compensating for the centrifugal forces alone presupposes an initial prestressing in excess of the centrifugal loads.

This prestressing is obtained by binding using tapes wound on in superposed turns in the grooves 22 and 24 and 26 under tension, the tapes featuring a core of glass fibers impregnated with a resin which is heat-hardenable, subsequent polymerization providing for immobilising the binding with the tension maintained.

The tape selected is of the Polyglas H200 type (Registered Trade Mark) manufactured by the company "Usines Diélectriques et Fil Isolé Moderne" and designed for binding the armature windings of motors, especially traction motors. FIG. 3 shows the bindings 122, 124 and 126 in cross-section, respectively accommodated in the grooves 22, 24 and 26.

The winding on method is schematically represented in FIG. 5. The ring 2 is clamped in place on the shaft 1. The bottom of the groove into which the binding tape 120 is to be wound is lined with a polytetrafluorethylene tape. The tape 120 is fed from a spool which is not shown and passes through a spooling machine 40. The spooling machine comprises a braked pretensioning pulley 41 around which the tape makes one turn. The tape is pressed onto the pulley 41 by rollers. The tape is then wound onto a capstan 42 equipped with an adjustable disk brake device, and then onto a set of pulleys 43 which guide the tape as it leaves the machine. The braking force on the capstan 42 is indicated on a pressure gauge 44. The winding machine 40 is a known and commercially available device. On leaving the winding machine 40 the tape is inserted into the binding groove.

The tape 120 is supplied pre-impregnated with a polymerizable polyester resin. The tape is fed into the groove in the ring driven at constant speed, the binder in the preheated resin holding it in place.

The shaft 1 is rotated slowly (a few revolutions per minute). The normal rotators cannot be used for this operation, as they are designed for rotation speeds of several tens of rotations per minute; auxiliary rotators, of the kind used on assembling the set, are used instead.

As it is applied the tape 120 is preheated by an infrared radiator 46, in accordance with the recommendations of the manufacturer. Approximately three turns are applied without braking the capstan, to prevent the tape slipping in the groove. The brake is then engaged, in accordance with an approximately linear progressive law. It has been found that executing the binding into a groove improves the binding process, probably because the partition walls which delimit the groove also limit crushing of the tape due to the binding force of layers nearer the outside of the binding.

When the required number of turns has been wound on, the tape is temporarily locked in position, still under tension, by applying a copper bit heated to a few hundred degrees centigrade to points on the outside surface of the binding regularly distributed over one half-turn. The tape may then be cut.

It should be noted that it is extremely important to begin binding in the central groove 22, so that the binding 122 applies force in the plane of symmetry of the ring, perpendicular to the axis, and results in symmetrical prestressing. Once the binding 122 has been executed, then the bindings 124 and 126 are applied.

Should it appear beneficial to use more than three bindings, the number used should be odd and the central binding should be wound on first.

Once the winding on of the bindings has been finished, the resin is polymerized. The periphery of the ring is fitted with an electrical heating jacket which raises the temperature of the resin to the polymerization temperature for the necessary time.

The polymerization temperature must be chosen so that the instrumentation modules are not damaged and so that the resulting temperature of the shaft 1 remains below the limit imposed for the safety of the set (100° C.). To this end there are disposed in recesses formed in the ring below the bottom of the grooves thermocouples with their junctions in the median plane of the ring. Polymerization takes approximately 20 hours at 125° C. The thermocouples make it possible to regulate the polymerization temperature, their readings being recorded for purposes of verification.

Blind radial recesses 31 (see FIG. 2) are formed in the internal periphery of the ring 2, at three points spaced by 120°. They are shown in detail in FIG. 6. These cylindrical recesses 31 have a faced bottom 310 which is tangential to the neutral fiber cylinder of the half-ring 20. In this recess there is disposed a deformation sensor 311 with a measuring ring carrying strain gauges and bearing on the shaft and on the bottom 310 of the recess 31. These sensors are connected to measuring modules.

The information provided by the deformation sensors 311 is used during the binding operations. In normal operation of the set they provide an indication of the integrity of the bindings, and possibly an alarm indication in the event of a defect in the bindings.

FIG. 7 is a schematic representation of a turbo-generator set with, on a shaft line, a turbine with a high-pressure stage 51, a medium-pressure stage 52, two low-pressure stages 53 and 54 in tandem, an alternator 55 and an exciter 56. Disposed on the shaft line are three instrumentation support rings 61, 62 and 63 for torsion sensors. The ring 61 is disposed on the shaft of the alternator 55, in the enclosure which is cooled by hydrogen and on the same side as the exciter, the ring 62 is disposed between the alternator 55 and the second low-pressure stage 54 and the ring 63 is disposed between the two low-pressure stages 53 and 54. These measuring arrangements are intended to determine the mechanical behavior in torsion of the shaft line at locations subject to various loadings, in response to transient disturbances of high amplitude on the electrical grid, such as clear faults at the secondary windings of the plant transformers or tripping out of the plant circuit-breakers.

It will be understood that various changes in the details, materials and arrangements of parts which have been herein described and illustrated in order to explain the nature of the invention may be made by those skilled in the art within the principle and scope of the invention as expressed in the appended claims.

We claim:

1. Rotary machine rotor instrumentation support ring comprising two half-rings adapted to be attached to said rotor so as to remain attached thereto at speeds up to and in excess of the maximum speed thereof, an odd number of annular grooves in an outside cylindrical surface of said ring in an arrangement which is symmetrical relative to a median plane thereof, and a respective winding in each of said grooves made up of superposed turns of a tape of high-strength fibers immobilized under tension in a polymerized resin matrix.

2. Support ring according to claim 1, wherein said fibers are glass fibers.

3. Support ring according to claim 1, comprising three of said annular grooves, the central groove being wider than the others.

4. Support ring according to claim 1, wherein said half-rings fit together on a mating plane passing through the shaft axis and are held together by bolts perpendicular to said plane.

5. Support ring according to claim 4, comprising a plurality of cylindrical bores parallel to the shaft axis in an arrangement which is symmetrical relative to said shaft axis and to said mating plane, said bores constituting housings for instrumentation modules.

6. Support ring according to claim 1, further comprising deformation sensors disposed in recesses in the inside perimeter of the ring in abutting relationship thereto and to said shaft and in an equi-angularly spaced arrangement.

7. Method for attaching to a rotary machine rotor shaft a support ring comprising two half-rings adapted to be attached to said rotor so as to remain attached thereto at speeds up to and in excess of the maximum speed thereof, an odd number of annular grooves in an outside cylindrical surface of said ring in an arrangement which is symmetrical relative to a median plane thereof, and a respective winding in each of said grooves made up of superposed turns of a tape of high-strength fibers immobilized under tension in a polymerized resin matrix, in which method said half-rings are bolted together around said shaft, said tape of high-strength fibers is wound on under tension in superposed layers impregnated with a polymerizable resin, firstly into the central groove and then into the other grooves on alternate sides of the central groove, and said resin is polymerized with said tape still under tension.

8. Method according to claim 7, wherein said resin is polymerizable by heating it and is polymerized by wrapping a heating jacket around said ring and increasing the temperature thereof to a value high enough and for a time long enough to completely polymerize said resin.

9. Method according to claim 8, wherein the temperature of said heating jacket is conditioned by temperature sensors disposed in said ring.

10. Method according to claim 8, wherein said polymerizable resin is preheated during the winding on of said tape by exposing it to infra red radiation.

11. Method according to claim 7, wherein the tension in said tape during winding on is conditioned by the progress of such winding on, in accordance with a predefined relationship therebetween.

* * * * *